United States Patent [19]

Fabricius

[11] Patent Number: 5,275,928
[45] Date of Patent: Jan. 4, 1994

[54] ARYLIDENE SENSITIZING DYES FOR TABULAR GRAINS

[75] Inventor: Dietrich M. Fabricius, Hendersonville, N.C.

[73] Assignee: E. I. Du Pont de Nemours and Company, Wilmington, Del.

[21] Appl. No.: 799,137

[22] Filed: Nov. 27, 1991

[51] Int. Cl.$^5$ ................................. G03C 1/10
[52] U.S. Cl. .................. 430/567; 430/570; 430/966; 430/592; 430/593; 430/594; 430/595; 430/572
[58] Field of Search ............. 430/573, 591, 966, 592, 430/593, 594, 595, 570, 572, 567

[56] References Cited

U.S. PATENT DOCUMENTS

| | | | |
|---|---|---|---|
| 2,241,238 | 5/1941 | Brooker et al. | 430/592 |
| 3,445,231 | 5/1969 | Nishio et al. | 96/84 |
| 3,615,546 | 10/1971 | Deporter et al. | 96/84 |
| 3,627,532 | 12/1971 | Depoorter et al. | 430/522 |
| 3,865,817 | 2/1975 | Kobayashi et al. | 430/941 |
| 4,225,653 | 9/1980 | Brixner | 428/539 |
| 4,311,787 | 1/1982 | Lemahieu et al. | 430/522 |
| 4,756,995 | 7/1988 | Kojima et al. | 430/412 |
| 4,762,769 | 8/1988 | Takahashi et al. | 430/264 |
| 5,028,520 | 7/1991 | Ito | 430/567 |
| 5,079,134 | 1/1992 | Toya | 430/434 |
| 5,098,818 | 3/1992 | Ito et al. | 430/434 |
| 5,108,887 | 4/1992 | Fabricius et al. | 430/567 |

FOREIGN PATENT DOCUMENTS

| | | |
|---|---|---|
| 0105425 | 9/1983 | European Pat. Off. |
| 0377961 | 11/1989 | European Pat. Off. |
| 0384633 | 2/1990 | European Pat. Off. |
| 0384634 | 2/1990 | European Pat. Off. |
| 0434026 | 12/1990 | European Pat. Off. |
| 46-000549 | 8/1971 | Japan ............... 430/592 |
| 2-287347 | 11/1990 | Japan ............... 430/570 |

Primary Examiner—Charles L. Bowers, Jr.
Assistant Examiner—John A. McPherson

[57] ABSTRACT

A photographic element is described with improved speed in the blue and ultra-violet region of the electromagnetic spectrum. The spectral response of the photographic element is enhanced with at least one dye represented by

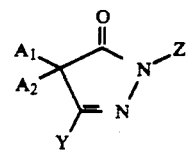

wherein $A_1$ and $A_2$ are hydrogen or taken together represent X—CH=, wherein X is hydrogen, alkyl or substituted alkyl, substituted or unsubstituted five-member heterocyclic ring, substituted or unsubstituted six-member heterocyclic ring, aryl or an aryl substituted by at least one element chosen from the group consisting of alkyl, halogen, aryl, carbonyl, alkoxy, sulfonate, carboxy or triflouralkyl; Y is alkyl, aryl or COR wherein R is OH, $NR^2$ or $OM^+$, wherein R2 is hydrogen, alkyl, substituted alkyl, aryl or substituted aryl; wherein $M+$ is $HNR^3{}_3{}^+$ or a metal cation, wherein R3 is hydrogen, alkyl or substituted alkyl, aryl or substituted aryl; Z is hydrogen, alkyl, substituted alkyl, aryl or substituted aryl.

6 Claims, No Drawings

ARYLIDENE SENSITIZING DYES FOR TABULAR GRAINS

FIELD OF INVENTION

This invention relates to photographic silver halide emulsions and specifically to emulsions which contain dyes for spectral sensitization and increased photographic speed. This invention relates more specifically to photographic emulsions which contain arylidene sensitizing dyes for use with tabular grains and the use of these photographic emulsions with x-ray intensifying screens.

BACKGROUND OF THE INVENTION

Photographic emulsions which contain predominantly tabular silver halide grains are well known in the prior art. These grains are known to provide several advantages over more conventional spherical grains. Tabular grains can generally be coated at a lower coating weight than conventional grains thereby providing a savings in the manufacturing cost of the film. However, since tabular grains have an inherently low sensitivity to actinic radiation there is a pressing need to provide spectral sensitizing dyes so that all of the advantages of tabular grains can be fully exploited. Spectral sensitizing dyes are well known in the art for green and red sensitization of tabular grains yet relatively few examples are provided for spectral sensitization of tabular grains in the ultraviolet and blue regions of the electromagnetic spectrum.

The use of photographic emulsions, as described above, with x-ray intensifying screens is well known in the art of medical imaging.

The x-ray intensifying screens typically comprise a phosphor as the active element for conversion of x-ray energy to lower energy visible or ultraviolet radiation.

Particularly efficient phosphors which may be used in the preparation of an X-ray intensifying screen are the tantalates described by Brixner in U.S. Pat. No. 4,225,623. These phosphors are based on yttrium, lutetium, and gadolinium tantalates of the M' monoclinic form and may be activated with rare earths such as terbium, thulium and niobium, for example, as well described in the aforementioned reference. Since these phosphors have a high X-ray stopping power, they are presently widely used for the preparation of these intensifying screens and the method for their preparation includes the mixing of ingredients followed by firing this mixture to form the phosphor crystal lattice itself.

Phosphor screen combinations have been widely utilized in the art. The majority of this use has been with green emitting screens and photographic emulsions which are sensitized to the green. Blue emitting screens used with silver halide element which are not spectrally sensitized are also known in the art. In the blue sensitive systems the practitioner is typically relying almost exclusively on the inherent sensitivity of the silver halide to blue and ultra-violet radiation. There has been a long felt need in the art for improved sensitization of silver halide elements in the blue and ultra-violet regions of the electromagnetic spectrum to increase the system speed of radiographic elements with blue and ultra-violet emitting radiographic screens and thereby take advantage of the inherent improved resolution of the shorter wavelength screens.

SUMMARY OF THE INVENTION

The present invention comprises the use of specific dyes for improved spectral sensitization of silver halide photographic emulsions to the blue and ultra-violet regions of the electromagnetic spectrum. An embodiment of the present invention provides for a photographic element comprising a support, a hydrophilic colloid layer and a photosensitive composition which composition is present as a portion of the colloid layer or in a separate layer wherein the composition contains silver halide grains and at least one dye represented by

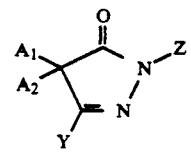

wherein $A_1$ and $A_2$ are hydrogen or taken together represent X—CH=, wherein X is hydrogen, alkyl or substituted alkyl, substituted or unsubstituted five-member heterocyclic ring, substituted or unsubstituted six-member heterocyclic ring, aryl or an aryl substituted by at least one element chosen from the group consisting of alkyl, halogen, aryl, carbonyl, alkoxy, sulfonate, carboxy or triflouralkyl; Y is alkyl, aryl or COR wherein R is OH, $NR^2$ or $OM^+$, wherein R2 is hydrogen, alkyl, substituted alkyl, aryl or substituted aryl; wherein $M+$ is $HNR^3{}_3{}^+$ or a metal cation, wherein R3 is hydrogen, alkyl or substituted alkyl, aryl or substituted aryl; Z is hydrogen, alkyl, substituted alkyl, aryl or substituted aryl.

Another embodiment to the present invention provides improvements in radiographic systems. The improvement comprises the use of a silver halide photographic emulsion, which is spectrally sensitized to the blue or ultra-violet, in combination with a blue or ultra-violet emitting radiographic screen. These and other considerations are provided in a radiographic element comprising at least one x-ray intensifying screen in operative association with a photographic element wherein a photographic element comprising a support, a hydrophilic colloid layer and a photosensitive composition which composition is present as a portion of the colloid layer or in a separate layer wherein the composition contains silver halide grains and at least one dye represented by

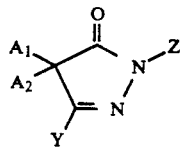

wherein $A_1$ and $A_2$ are hydrogen or taken together represent X—CH=, wherein X is hydrogen, alkyl or substituted alkyl, substituted or unsubstituted five-member heterocyclic ring, substituted or unsubstituted six-member heterocyclic ring, aryl or an aryl substituted by at least one element chosen from the group consisting of alkyl, halogen, aryl, carbonyl, alkoxy, sulfonate, carboxy or triflouralkyl; Y is alkyl, aryl or COR wherein R is OH, $NR^2$ or $OM^+$, wherein R2 is hydrogen, alkyl, substituted alkyl, aryl or substituted aryl; wherein $M+$ is $HNR^3_3+$ or a metal cation, wherein R3 is hydrogen, alkyl or substituted alkyl, aryl or substituted aryl; Z is hydrogen, alkyl, substituted alkyl, aryl or substituted aryl. A particularly preferred embodiment comprises a photographic element, as described, in combination with an x-ray intensifying screen which comprises a phosphor selected from the group consisting of:
  (a) $YNb_xTa_{1-x}O_4$, where x is 0 to about 0.15;
  (b) $LuNb_xTa_{1-x}O_4$, where x is 0 to about 0.2;
  (c) $Y_{1-y}Tm_yTaO_4$, where y is 0 to about 0.03;
  (d) a solid solution of (a) and (b);
  (e) a solid solution of (a) and (c);
  (f) $Y_{1-y}Tb_yTaO_4$, where y is about 0.001 to about 0.15;
  (g) $Lu_{1-y}Tb_yTaO_4$, where y is about 0.001 to about 0.15;
  (h) $Gd_{1-y}Tb_yTaO_4$, where y is about 0.001 to about 0.15;
  (i) a solid solution of at least two of (f), (g) and (h);
  (j) any of (a) to (i) wherein up to 45 mole percent of the yttrium, lutetium or gadolinium is replaced by lanthanum;
  (k) any of (a) to (i) wherein up to 15 mole percent the yttrium, lutetium or gadolinium is replaced by ytterbium; and
  (l) any of (a), (b), (c), (d) and (e) wherein up to 15 mole percent of the yttrium or lutetium is replace by gadolinium.

DETAILED DESCRIPTION OF THE INVENTION

A class of arylidene dyes incorporated into a tabular silver halide emulsion according to the teachings of this invention provide an increased absorption in the blue and ultraviolet region of the electromagnetic spectrum. The dye of this invention has the following broad generic structure:

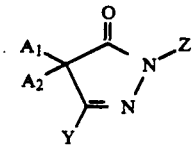

wherein $A_1$ and $A_2$ are hydrogen or taken together represent $X-CH=$, wherein X is hydrogen, alkyl or substituted alkyl, substituted or unsubstituted five-member heterocyclic ring, substituted or unsubstituted six-member heterocyclic ring, aryl or an aryl substituted by at least one element chosen from the group consisting of alkyl, halogen, aryl, carbonyl, alkoxy, sulfonate, carboxy or triflouralkyl; Y is alkyl, aryl or COR wherein R is OH, $NR^2$ or $OM^+$, wherein R2 is hydrogen, alkyl, substituted alkyl, aryl or substituted aryl; wherein $M+$ is $HNR^3_3+$ or a metal cation, wherein R3 is hydrogen, alkyl or substituted alkyl, aryl or substituted aryl; Z is hydrogen, alkyl, substituted alkyl, aryl or substituted aryl.

Exemplary examples of specific dye structures useful within the ambit of this invention are as follows:

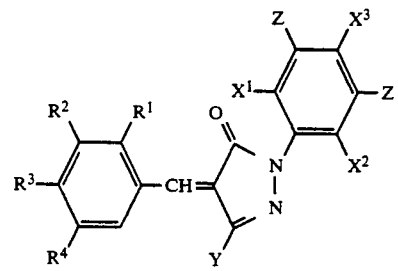

| Dye | R1 | R2 | R3 | R4 | Y | X1 | X2 | X3 | Z | $\lambda_{MAX}$ ($\epsilon \times 10^{-4}$) | MP (°C.) |
|---|---|---|---|---|---|---|---|---|---|---|---|
| 1 | H | CF3 | H | CF3 | CH3 | H | H | CO2H | H | 290 (2.6) | 312-16 |
| 2 | SO3−Na+ | H | H | H | CH3 | H | H | CO2H | H | 290 (2.4) | 350+ |
| 3 | H | H | CO2H | H | CH3 | H | H | CO2H | H | 325 (2.5) | 339-42 |
| 4 | H | H | CH3 | H | CH3 | H | H | CO2H | H | 335 (3.6) | 291-94 |
| 5 | H | H | CH3 | H | CO2H | H | | SO3−Na+ | H | 340 (1.6) | >350 |
| 6 | CH3 | H | CH3 | H | CH3 | H | H | CO2H | H | 345 (2.1) | 219-37 |
| 7 | H | H | MeO | H | CH3 | CO2H | H | H | H | 345 (0.9) | 120-130 |
| 8 | H | H | MeO | H | CH3 | H | H | H | CO2H | 360 (2.0) | 333 |
| 9 | H | H | MeO | H | CH3 | H | H | SO3−Na+ | H | 360 (2.7) | 215 |
| 10 | H | H | MeO | H | Me | H | H | H | H | 360 (2.8) | 128 |
|  |  |  |  |  |  |  |  |  |  | 361 (1.8) | 109-13 |
| 11 | H | H | MeO | H | CH3 | H | H | CO2H | H | 365 (3.1) | 282 |
| 12 | H | H | MeO | H | CO2H | H | H | SO3−Na+ | H | 366 (2.5) | 315 (dec) |
| 13 | H | H | OH | H | CH3 | H | H | CO2H | H | 370 (3.5) | 328 |
| 14 | H | H | MeO | H | CF3 | H | H | CO2H | H | 375 (1.4) | 286 |
| 15 | H | MeO | MeO | H | CH3 | Cl | Cl | SO3−Na+ | H | 376 (0.8) | >350 |
| 16 | H | MeO | MeO | H | CH3 | H | H | H | H | 381 (2.7) | 157 |
| 17 | H | MeO | MeO | H | CH3 | H | H | CO2H | H | 385 (2.8) | 319-21 |
| 18 | H | MeO | MeO | H | CH3 | H | H | SO3−Na+ | H | 385 (2.3) | 230-50 |
| 19 | MeO | H | MeO | H | CH3 | H | H | SO3−Na+ | H | 388 (1.5) | 250-90 |
| 20 | MeO | H | MeO | H | CH3 | H | H | CO2H | H | 390 (3.0) | 273-74 |
| 21 | H | MeO | MeO | H | CO2H | H | H | SO3−Na+ | H | 390 (1.9) | >350 |

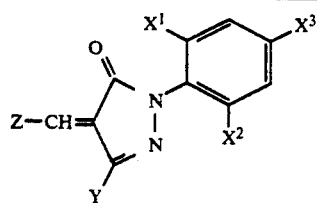

| Compound | Z | Y | X1 | X2 | X3 | $\lambda_{MAX}$ ($\epsilon \times 10^{-4}$) | MP(°C.) |
|---|---|---|---|---|---|---|---|
| 22 | CH₃—⟨furan⟩— | CO₂H | H | H | SO₃Na⁺ | 386(3.3) | >350 |
| 23 | Na⁺⁻O₃S—⟨furan⟩— | CH₃ | H | H | CO₂H | 365(4.1) | 295(dec) |
| 24 | ⟨indole⟩— | CH₃ | H | H | CO₂H | 405(2.7) | 354 |
| 25 | Na⁺⁻O₃S—⟨phenyl⟩— | CO₂H | H | H | SO₃Na⁺ | 341(1.9) | >350 |

The dyes of this invention may be dissolved in any of a host of suitable solvents including methanol, ethanol, water or dilute aqueous sodium hydroxide. These dyes can be added as a concentrated slurry in the aforementioned solvents to the tabular grain emulsions or more preferably as a solution. Time of addition is typically not critical. The dyes can be added at any time during the preparation of the grains, prior to or after the addition of gold and sulfur salts or after chemical sensitization is complete. Most preferable is addition after chemical sensitization is complete. The dyes are typically provided in an amount in the range 10 to 5000 mg of dye per mole of silver and preferably from 20 to 2000 mg of dye per mole of silver.

Any of the conventional halides may be used but we prefer pure silver bromide or silver bromide with small amounts of iodide incorporated therein (e.g., 98% Br and 2% I by weight for example). Any grain morphology is suitable for demonstration of these teachings including, but not limited to, grains which are formed by splash techniques and those formed by techniques involving spray techniques. Tabular grains are most preferred.

The grains are preferably dispersed in a binder (e.g., gelatin or other well-known binders such as polyvinyl alcohol, phthalated gelatins, etc.). In place of gelatin other natural or synthetic water-permeable organic colloid binding agents known in the art can be used as a total or partial replacement thereof. It is common to use binder adjuvants useful for increasing covering power such as dextran or the modified, hydrolysed gelatins of Rakoczy, U.S. Pat. No. 3,778,278.

It is most preferable to chemically sensitize the grain with salts that are well known in the art. The most common sensitizers are salts of gold or sulfer. Sulfur sensitizers include those which contain labile sulfur, e.g., allyl isothiocyanate, allyl diethyl thiourea, phenyl isothiocyanate and sodium thiosulfate for example. The "Further sensitizers are the polyoxyalkylene" ethers in Blake et al., U.S. Pat. No. 2,400,532, and the polyglycols disclosed in Blake et al., U.S. Pat. No. 2,423,549. Other non-optical sensitizers such as amines as taught by Staud et al., U.S. Pat. No. 1,925,508 and Chambers et al., U.S. Pat. No. 3,026,203, and metal salts as taught by Baldsiefen, U.S. Pat. No. 2,540,086 may also be used. Spectral sensitization can also be employed to render the emulsion most sensitive to specific colors. The methods are well known in the art and include, but are not limited to, cyanines, merocyanines, oxonols, hemioxonols, styryls, merostyryls, complex cyanines and merocyanines (i.e., tri-, tetra-, and polynuclear cyanines and merocyanines), and streptocyanines as illustrated in *Research Disclosure*, No 308, December, 1989, Item 308119.

The emulsions can contain known antifoggants, e.g., 6-nitrobenzimidazole, benzotriazole, triazaindenes, etc., as well as the usual hardeners, i.e., chrome alum, formaldehyde, dimethylol urea, mucochloric acid, etc. Other emulsion adjuvants that may be added comprise matting agents, plasticizers, toners, optical brightening agents, surfactants, image color modifiers, non-halation dyes, and covering power adjuvants among others.

The film support for the emulsion layers used in the novel process may be any suitable transparent plastic. For example, the cellulosic supports, e.g., cellulose acetate, cellulose triacetate, cellulose mixed esters, etc. may be used. Polymerized vinyl compounds, e.g., copolymerized vinyl acetate and vinyl chloride, polystyrene, and polymerized acrylates may also be mentioned.

When polyethylene terephthalate is manufactured for use as a photographic support, it is preferable to use a mixed polymer subbing composition such as that taught by Rawlins, U.S. Pat. No. 3,567,452, Miller, U.S. Pat. Nos. 4,916,011 and 4,701,403, Cho, U.S. Pat. Nos. 4,891,308 and 4,585,730 and Schadt, U.S. Pat. No. 4,225,665. Upon completion of stretching and application of subbing composition, it is necessary to remove strain and tension in the base by a heat treatment comparable to the annealing of glass.

The emulsions may be coated on the supports mentioned above as a single layer or multi-layer element. For medical x-ray applications, for example, layers may be coated on both sides of the support which conventionally contains a dye to impart a blue tint thereto. Contiguous to the emulsion layers it is conventional, and preferable, to apply a thin stratum of hardened gelatin supra to said emulsion to provide protection thereto.

The emulsions of this invention can be used in any of the conventional photographic systems (e.g., negative or positive-working systems). Thus, they can contain any of the adjuvants related to the particular system employed. For example, the emulsions when employed as direct positive may be chemically fogged using metals such as rhodium or iridium and the like, or with other chemical fogging agents such as boranes, as well-known to those skilled in the art.

It is conventional to use the photographic emulsions of this invention with X-ray intensifying screens. These are usually used in pairs in cooperation with double-side coated medical X-ray silver halide photographic film elements, although it is sometimes common to use single-side coated silver halide photographic film elements for some applications. A pair of screens is conventionally used and the coating weights of each screen may be different, if required. Thus, an asymmetric pair of screens can be used to get the best results. Medical X-ray evaluations represent the commercial use for the phosphor of this invention cast into an X-ray intensifying screen. A dimensionally stable, polyethylene terephthalate film support into which small amounts of rutile or anatase titanium dioxide have been incorporated is the preferred support for the phosphor of this invention.

Although any conventional silver halide photographic system can be employed to demonstrate the teachings of this invention a medical radiographic system will be used as an illustrative example.

Dye Preparation Procedures

Compound 26 can be procured from commercial sources. Dye 11 is prepared by the condensation of p-anisaldehyde (4.08 g, 0.03 mol) with 4-(3-methyl-5-oxo-2-pyrazolin-1-yl)benzoic acid (6.54 g, 0.03 mol) in 100 ml refluxing acetic acid containing 3.7 g (0.045 mol) anhydrous sodium acetate. After 3 hrs., the mixture was cooled and the product isolated by filtration. The product was rewashed with isopropanol, filtered, and dried to yield 8.30 g (82%), mp 280° C., $\lambda max=365$ nm ($\epsilon=35,000$), 280 nm ($\epsilon=20,000$).

Dye 12 was prepared in similar fashion. p-Anisaldehyde (4.08 g, 0.03 mol), sodium 4-(3-carboxy-5-oxo-2-pyrazolin-1-yl)benzensulfonate (9.18 g, 0.03 mol), and 7.4 g 0.09 mol) anhydrous sodium acetate were refluxed in 100 ml acetic acid for 4 hrs. The mixture was cooled and the product isolated by filtration. The product was rewashed with isopropanol, filtered, and dried to yield 9.93 g (74%), mp 315° C. (dec), $\lambda max=366$ nm ($\epsilon=25,000$), 261 nm ($\epsilon=20,000$, 420 (sh)).

Dye 24 was prepared in similar fashion. p-Anisaldehyde (4.08 g, 0.03 mol), 4-(3-methyl-5-oxo-2-pyrazolin-1-yl)benzoic acid (6.54 g, 0.03 mol), and 3.7 g (0.045 mol) anhydrous sodium acetate were refluxed in 100 ml acetic acid for 6.5 hrs. The mixture was cooled and the product isolated by filtration. The product was rewashed with isopropanol, filtered, and dried to yield 9.40 g (91%), mp 354° C., $\lambda max=405$ nm ($\epsilon=27,000$), 280 nm ($\epsilon=30,000$).

Dye 18 was prepared in similar fashion. 3,4-Dimethoxybenzaldehyde (4.98 g, 0.03 mol), 4-(3-methyl-5-oxo-2-pyrazolin-1-yl) benzensulfonic acid (7.62 g, 0.03 mol), and 7.4 g (0.09 mol) anhydrous sodium acetate were refluxed in 100 ml acetic acid for 4 hrs. The mixture was cooled and the product isolated by filtration. The product was rewashed with isopropanol, filtered, and dried to yield 12.35 g, mp 230°-250° C., $\lambda max=385$ nm ($\epsilon=23,000$).

Dye 9" was prepared in similar fashion. p-Anisaldehyde (4.08 g, 0.03 mol), 4-(3-methyl-5-oxo-2-pyrazolin-1-yl)benzensulfonic acid (7.62 g, 0.03 mol), and 7.4 g 0.09 mol) anhydrous sodium acetate were refluxed in 100 ml acetic acid for 2 hrs. The mixture was cooled and the product isolated by filtration. The product was rewashed with isopropanol, filtered, and dried to yield 6.28 g, mp 215° C., $\lambda max=360$ nm ($\epsilon=27,000$), 258 nm ($\epsilon=21,000$), 420 (sh). Other dye samples can be prepared in a manner analogous to those listed above as known in the art.

Screen Samples

Screen A is a standard LaOBr:Tm predominantly blue emitting screen which is commercially available from Du Pont (Wilmington, Del.). Screen B is a standard YTaO$_4$:NB predominantly blue emitting screen prepared as described in Brixner, U.S. Pat. No. 4,225,653 which is included herein by reference thereto. Screen C is a predominantly UV emitting YTaO$_4$ screen prepared by the procedure as described in Brixner and further elaborated below:

A. The Binder Solution

The following ingredients were prepared:

| Ingredient | Amount (g) |
|---|---|
| n-Butyl acetate | 43.13 |
| n-Propanol | 34.00 |
| Carboset 525 (1) | 10.00 |
| Carboset 526 (2) | 10.00 |
| Polymeric organic silicone fluid | 0.07 |
| Zelec 2457E (3) | 0.40 |
| Aerosol OT-100 (4) | 0.40 |
| Pluronic 31R1 (5) | 2.00 |

(1) Acrylic resin; ave. mol. wt. 260,000; acid no. 76-85; B. F. Goodrich Co., Cleveland, OH
(2) Acrylic resin; ave. mol. wt. 200,000; acid no. 100; B. F. Goodrich Co., Cleveland, OH
(3) Anionic antistatic agent of mixed mono and dialkylphosphates of the general structure R2HPO4, where R is C8 to C10 alkyl; E. I. du Pont de Nemours & Co., Wilmington, DE
(4) Sodium dioctyl sulfosuccinate per U.S. Pat. No. 2,441,341
(5) Ethylene oxide/propylene oxide block copolymer; ave. mol. wt. 3,200; BASF Wyandotte; Wyandotte, MI

B. The X-ray Phosphor

The following ingredients were thoroughly mixed in a paint shaker for about 2 hrs before charging to an alumina crucible:

| Ingredient | Amount (g) |
|---|---|
| Y2O3 | 101.46 |
| Ta2O5 | 198.54 |
| Li2SO4 | 150.00 |

The crucible was then placed in a standard, commercial, high temperature furnace and fired at about 1200° C. for about 8 hrs and then at about 1250° C. for about 16 hrs. The furnace was then allowed to cool and the contents of the crucible weighed and washed thoroughly with water to remove the unreacted salts and flux. This material was then added to the binder from above using about 200 g of phosphor/60 g of binder solution. This material was placed in a plastic container along with about 85 g of 3.8 in. diameter corundum balls (ca. 15 balls) and this mixture was then ball milled for about 12 to 16 hrs at room temperature with a rotation speed of about 60 rpm. After this step, the ball milled suspension was filtered through a 75 mesh Nylon bag and coated onto a suitable support.

The support used was 0.010 inch thick, dimensionally stable polyethylene terephthalate film containing a small amount of a whitener (e.g., anatase TiO2) dispersed therein. This whitener will give the support some opacity to visible light (e.g., optical density of ca. >1.7). The coating weight of the phosphor dispersion placed thereon is about 100 mg of phosphor per cm2.

C. The Overcoat Layer

An overcoat layer is prepared from the following solutions:

| 1) Ingredient | Amount (g) |
|---|---|
| Acetone | 67.00 |
| Methanol | 9.00 |
| n-Butyl acetate | 4.80 |
| Tyril* 100 (1) | 12.70 |
| Carboset* XL-27 (2) | 9.00 |

(1) Styrene/acrylonitrile copolymer resin; Dow Chemical Co., Midland, MI
(2) Acrylic resin; ave. mol. wt. 30,000; acid no. 80, B. F. Goodrich Co., Cleveland, OH A gel solution is prepared by mixing the following ingredients until a thick gel forms:

| 2) Ingredient | Amount (g) |
|---|---|
| Methanol | 14.70 |
| Triamylamine | 0.20 |
| Carbopol* 1342 (1) | 0.132 |

(1) Acrylic resin thickener; B. F. Goodrich Co., Cleveland, OH

This solution is filtered and a mixture is prepared as follows:

| 3) Ingredient | Amount (g) |
|---|---|
| Solution 1 | 50.00 |
| Gel Solution 2 | 12.19 |

This mixture is coated on top of the phosphor coating using a doctor knife with a 0.004 in. gap. The resulting top-coat is air dried for 12-16 hrs at 40° C.

Emulsion Preparation

The advantages of the teachings of this invention are provided in the following emulsion examples.

A silver bromide tabular emulsion was made according to the teachings of Ellis, U.S. Pat. No. 4,801,522. After precipitation of the grains the average aspect ratio was determined to be about 5:1 and thickness of about 0.2 μm. These grains were dispersed in photographic grade gelatin (about 117 grams gelatin/mole of silver bromide) and a solution of 250 mg of dye A and 161 mg tributylamine in 2.9 ml of methanol was added to achieve 150-217 mg of dye per mole of silver halide.

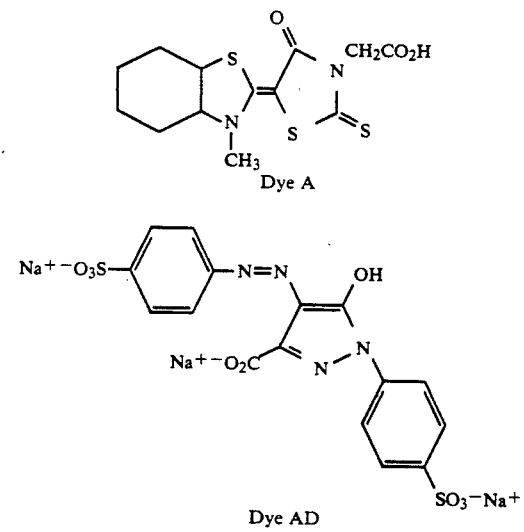

Dye A

Dye AD

At this point, the emulsion was brought to its optimum sensitivity with gold and sulfur salts as is well-known to those skilled in the art. The emulsion was then stabilized by the addition of 4-hydroxy-6-methyl-1,3,3a,7-tetrazaindene and 1-phenyl-5-mercaptotetrazole. The usual wetting agents, antifoggants, coating aids, hardeners were added. Dye AD was added as an acutance dye. The compounds of this invention were then added as a methanol solution. This emulsion was then coated on a dimensionally stable, 7 mil polyethylene terephthalate film support which had first been coated with a conventional resin sub followed by a thin substratum of hardened gelatin applied supra thereto. These subbing layers were present on both sides of the support. The emulsion was coated on one side at 2 g silver per square meter. A thin abrasion layer of hardened gelatin was applied over the emulsion layer. For control purposes, a similar emulsion was made without the compound of this invention. Samples of each of these coatings were given an exposure through a test target and a conventional step wedge to X-rays interacting with an X-ray intensifying screen and then developed in a conventional X-ray film processor. Unless otherwise specified all speeds are relative and fog represents minimum density which includes the density contribution from the support. Evaluation of the samples are summarized in Table 1:

TABLE 1

| No. | Dye | Amt (g/mol AgBr) | Fog | Screen Speed A | B | C |
|---|---|---|---|---|---|---|
| 1 | control | — | .17 | 100 | 100 | 100 |
| 2 | 1 | 0.33 | .16 | 106 | 111 | 105 |
| 3 | 4 | 0.27 | .16 | 106 | 105 | 110 |
| 4 | 11 | 0.06 | .21 | 101 | 102 | 105 |
| 5 | 11 | 0.13 | .21 | 95 | 99 | 108 |
| 6 | 11 | 0.2 | .16 | 106 | 102 | 108 |
| 7 | 11 | 0.27 | .16 | 105 | 111 | 105 |
| 8 | 11 | 0.67 | .27 | 104 | 95 | 107 |
| 9 | 11 | 1.0 | .20 | 106 | 108 | 120 |
| 10 | 20 | 0.4 | .17 | 107 | 115 | ... |
| 11 | 24 | 0.33 | .20 | 104 | ... | 118 |
| 12 | 24 | 0.67 | .18 | 106 | 107 | 125 |
| 13 | 26 | 0.27 | .16 | 102 | 109 | 105 |
| 14 | 26 | 0.33 | .17 | 108 | 107 | 108 |

As shown above, the compounds of this invention enhance the sensitivity of the emulsion to the blue emissions of screens B and C and to the ultraviolet emissions of intensifying screen C.

EXAMPLE 2

An emulsion similar to that of Example 1 was prepared, except that the compounds of this invention were added prior to addition of the 4-hydroxy-6-methyl-1,3,3a,7-tetrazaindene. No acutance dye was added to this emulsion. Evaluation of the samples gave the results presented in Table 2.

TABLE 2

| No. | Dye | amt (g/mol AgBr) | Fog | Screen Speed A | B | C |
|---|---|---|---|---|---|---|
| 15 | control | — | .16 | 100 | 100 | 100 |
| 16 | 1 | 0.26 | .17 | 104 | 102 | 114 |
| 17 | 4 | 0.26 | ... | 103 | 105 | 109 |
| 18 | 11 | 0.06 | .19 | 104 | 112 | 104 |
| 19 | 11 | 0.26 | .22 | 104 | 100 | 108 |
| 20 | 11 | 0.27 | .19 | 107 | 112 | 112 |
| 21 | 24 | 0.03 | .17 | 109 | 98 | 95 |
| 22 | 24 | 0.06 | .18 | 109 | 95 | 92 |
| 23 | 26 | 0.26 | .17 | 107 | 100 | 115 |

This example shows that enhanced sensitivity to intensifying screen exposures can be obtained by adding the compounds of this invention prior to the addition of emulsion stabilizers.

EXAMPLE 3

An emulsion similar to that of Example 1 was prepared, except that the compound 11 of this invention was added in place of sensitizing dye A. A sample with no dye was used as a control. No acutance dye was added to this emulsion. The results presented were obtained using screen B. Evaluation of the samples gave the results presented in Table 3.

TABLE 3

| No. | Dye | amt (g/mol AgBr) | Screen Speed |
|---|---|---|---|
| 24 | none | — | 100 |
| 25 | A | 0.113 | 190 |
| 26 | 11 | 0.03 | 120 |
| 27 | 11 | 0.06 | 118 |
| 26 | 11 | 0.12 | 101 |
| 27 | 11 | 0.24 | 104 |
| 28 | 11/A | 0.20/0.17 | 218 |

This example demonstrates the advantage of the instant dyes. The combination of blue-sensitizing dye A along with the compounds of this invention (sample 28) gives supplemental sensitization and represents a preferred mode.

EXAMPLE 4

An emulsion similar to that of Example 1 was prepared, except that no acutance dye was added to this emulsion. Speed and print-through (PT) results are presented in Table 4.

TABLE 4

| No. | Description | Amt (g/mol AgBr) | Fog | Screen Speed A | B | C | PT |
|---|---|---|---|---|---|---|---|
| 29 | Control | — | .24 | 100 | 100 | 100 | 0.251 |
| 30 | AD | 0.53 | .19 | 87 | 83 | 100 | 0.232 |
| 31 | 12 | 0.67 | .19 | 106 | 107 | 115 | 0.247 |
| 32 | 12 + AD | 0.67 / 0.4 | .20 | 100 | 90 | 93 | 0.236 |
| 33 | 12 | 1.3 | .26 | 113 | 106 | 105 | 0.258 |
| 34 | 12 + AD | 1.3 / 0.4 | .25 | 95 | 95 | 91 | 0.226 |
| 35 | 12 + AD | 1.3 / 0.53 | .14 | 108 | 112 | ... | 0.24 |
| 36 | 5 + AD | 0.67 / 0.53 | .14 | 106 | 109 | ... | 0.24 |
| 37 | 12 + AD | 0.67 / 0.53 | .18 | 108 | 122 | ... | 0.227 |
| 38 | 12 + AD | 1.0 / 0.53 | .17 | 108 | 117 | ... | 0.215 |
| 39 | 12 + AD | 1.3 / 0.53 | .18 | 112 | 110 | ... | 0.225 |
| 40 | 21 + AD | 0.67 / 0.53 | .18 | 109 | 113 | ... | 0.227 |
| 41 | 21 + AD | 1.0 / 0.53 | .17 | 114 | 108 | ... | 0.236 |
| 42 | 21 + AD | 1.3 / 0.53 | .18 | 111 | 109 | ... | 0.234 |
| 43 | 5 + AD | 0.67 / 0.53 | .19 | 129 | 103 | ... | 0.231 |

This example shows that dyes of this invention can be used in combination with acutance dyes such as Dye AD to provide higher sensitivity with equivalent or greater print-through protection compared to usage of dyes like AD alone.

EXAMPLE 5

An emulsion similar to that of Example 1 was prepared, except that comparative compounds B and C were added prior to addition of the 4-hydroxy-6-methyl-1,3,3a,7-tetrazaindene. No acutance dye was added to this emulsion.

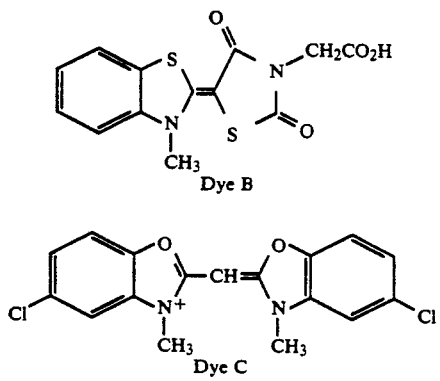

Evaluation of the samples gave the results presented in Table 5.

TABLE 5

| No. | Dye | Amt (g/mol AgBr) | Fog | Screen Speed A | B | C |
|---|---|---|---|---|---|---|
| 44 | Control | — | .21 | 100 | 100 | 100 |
| 45 | B | 0.017 | .18 | 95 | 98 | 98 |
| 46 | B | 0.033 | .18 | 92 | 87 | 94 |
| 47 | B | 0.067 | .17 | 93 | 91 | 88 |
| 48 | B | 0.133 | .18 | 83 | 87 | 82 |
| 49 | C | 0.036 | .19 | 83 | 81 | ... |
| 50 | C | 0.072 | .19 | 82 | 74 | ... |
| 51 | C | 0.144 | .17 | 63 | 60 | ... |

These examples show that comparative uv-absorbing cyanine dyes are not as effective in the emulsions as the compounds of this invention.

What is claimed is:

1. A photographic element comprising a support with at least one hydrophilic colloid layer coated thereon; said hydrophilic colloid layer comprises silver halide grains which are spectrally sensitized with at least one dye represented by

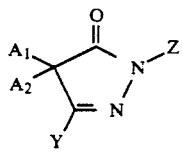

wherein $A_1$ and $A_2$ taken together represent X—CH=, wherein X is hydrogen, alkyl or substituted alkyl, substituted or unsubstituted furan or indole, aryl or an aryl substituted by at least one element chosen from the group consisting of alkyl, halogen, aryl, carbonyl, alkoxy, sulfonate or triflouralkyl; Y is alkyl, aryl or COR wherein R is OH, $NR^2$ or $OM^+$, wherein R2 is hydrogen, alkyl, substituted alkyl, aryl or substituted aryl; wherein $M+$ is $HNR^3_3+$ or a metal cation, wherein R3 is hydrogen, alkyl or substituted alkyl, aryl or substituted aryl; Z is hydrogen, alkyl, substituted alkyl, aryl or substituted aryl.

2. A photographic element as recited in claim 1 wherein at least 50% of said silver halide grains comprise tabular grains with an average aspect ratio of greater than 2:1.

3. A photographic element as recited in claim 1 wherein at least one said dye is chosen from the group consisting of

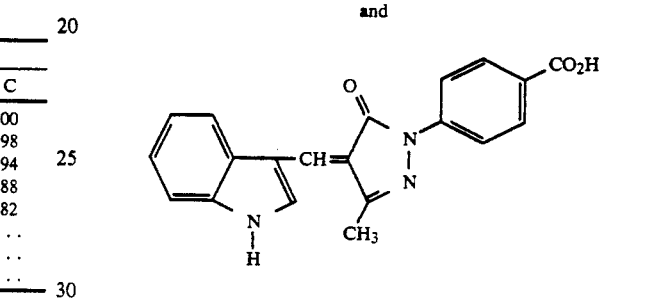

4. A photographic element as recited in claim 1 wherein at least one said hydrophilic colloid layer further comprises at least one acutance dye.

5. A photographic element as recited in claim 1 further comprising

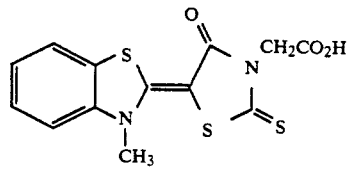

6. A photographic element comprising a support with at least one hydrophilic colloid layer coated thereon; said hydrophilic colloid layer comprises silver halide grains which are spectrally sensitized with at least one dye represented by

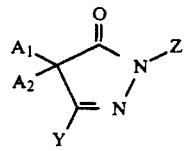

wherein $A_1$ and $A_2$ taken together represent X—CH=, wherein X is hydrogen, alkyl or substituted alkyl, aryl or an aryl substituted by at least one element chosen from the group consisting of alkyl, halogen, aryl, carbonyl, alkoxy, sulfonate or triflouralkyl; Y is alkyl, aryl or COR wherein R is OH, $NR^2$ or $OM^+$, wherein R2 is hydrogen, alkyl, substituted alkyl, aryl or substituted aryl; wherein $M+$ is $HNR^3_3+$ or a metal cation, wherein R3 is hydrogen, alkyl or substituted alkyl, aryl or substituted aryl; Z is hydrogen, alkyl, substituted alkyl, aryl or substituted aryl.

* * * * *